United States Patent [19]

Furnish

[11] Patent Number: 4,686,499
[45] Date of Patent: Aug. 11, 1987

[54] POLICE RADAR WARNING RECEIVER WITH CANTILEVERED PC BOARD STRUCTURE

[75] Inventor: Gregory R. Furnish, Mason, Ohio

[73] Assignee: Cincinnati Microwave, Inc., Cincinnati, Ohio

[21] Appl. No.: 838,931

[22] Filed: Mar. 12, 1986

Related U.S. Application Data

[62] Division of Ser. No. 656,026, Sep. 28, 1984, Pat. No. 4,613,989.

[51] Int. Cl.$^4$ .......................... H05K 1/18; H05K 5/02; H05K 7/12
[52] U.S. Cl. .................................. 333/230; 333/250; 331/96; 361/398; 455/347
[58] Field of Search ............... 333/250, 230, 227, 247; 361/400, 399, 398; 343/786, 711, 712, 5 DD, 5 PD, 18 E; 455/328, 347, 280, 281; 331/96, 107 DP, 107 SL

[56] References Cited

U.S. PATENT DOCUMENTS

| | | | |
|---|---|---|---|
| 2,408,055 | 9/1946 | Fiske | 333/13 |
| 2,414,376 | 1/1947 | Heim | 343/786 |
| 2,508,918 | 5/1950 | Hines, Jr. | 343/702 X |
| 2,629,865 | 2/1953 | Barker | 343/8 |
| 2,650,935 | 9/1953 | Rust et al. | 343/786 |
| 2,832,885 | 4/1958 | Brett | 455/281 |
| 2,851,686 | 9/1958 | Hagaman | 343/786 |
| 2,852,723 | 9/1958 | Escoffery | 357/79 |
| 2,853,656 | 9/1958 | Dowds | 361/412 |
| 2,855,257 | 9/1958 | Barker et al. | 312/7.1 |
| 3,100,894 | 8/1963 | Giller et al. | 343/756 |
| 3,200,297 | 8/1965 | Gibson | 361/412 |
| 3,226,466 | 12/1965 | Martin | 174/16 HS |
| 3,280,383 | 10/1966 | Emeis | 357/79 |
| 3,280,384 | 10/1966 | Emeis | 357/79 |
| 3,293,508 | 12/1966 | Boyer | 357/79 |
| 3,395,059 | 7/1968 | Butler et al. | 343/786 X |
| 3,447,118 | 5/1969 | Ferree | 357/79 X |
| 3,449,698 | 6/1969 | Cooper | 333/208 |
| 3,480,836 | 11/1969 | Aronstein | 361/400 X |
| 3,512,155 | 5/1970 | Bloice | 343/8 |
| 3,588,741 | 6/1971 | Glance | 331/96 |
| 3,619,473 | 11/1971 | Meyerhoff | 174/15 R |
| 3,648,114 | 3/1972 | Manuali et al. | 361/412 |
| 3,657,670 | 4/1972 | Kitazume et al. | 333/208 |
| 3,659,223 | 4/1972 | Mawhinney | 331/96 X |
| 3,736,591 | 5/1973 | Rennels et al. | 343/702 |
| 3,747,109 | 7/1973 | Corbell et al. | 343/702 |
| 3,789,248 | 1/1974 | Jaecklin et al. | 357/79 X |
| 3,800,104 | 3/1974 | Lien et al. | 200/5 A |
| 3,896,544 | 7/1975 | Fosnough | 357/79 X |
| 3,899,759 | 8/1975 | Hines et al. | 333/212 |
| 3,909,564 | 9/1975 | Scheingold et al. | 361/398 X |
| 3,999,025 | 12/1976 | Sims, Jr. | 200/5 A X |
| 4,058,813 | 11/1977 | Risko | 343/786 |
| 4,079,268 | 3/1978 | Fletcher et al. | 361/395 X |

(List continued on next page.)

FOREIGN PATENT DOCUMENTS

| | | | |
|---|---|---|---|
| 2349017 | 4/1975 | Fed. Rep. of Germany | 333/247 |
| 0139358 | 10/1979 | Japan | 343/702 |
| 0021623 | 2/1980 | Japan | 333/250 |
| 78602 | 6/1980 | Japan | |
| 0087965 | 7/1980 | Japan | 343/786 |
| 979768 | 1/1965 | United Kingdom | |
| 0843039 | 6/1981 | U.S.S.R. | 333/208 |

OTHER PUBLICATIONS

An Antenna from an Escort Radar Warning Receiver, with Photographs E & F.

"The Design of Inductive Post-Type Microwave Filters", *Journal Brit. I.R.E.*, May 1958, by M. H. N. Potok.

"Low-Noise 12GHz Front-End Designs for Direct Satellite Television Reception", *Phillips Technical Re-*

(List continued on next page.)

*Primary Examiner*—Eugene R. LaRoche
*Assistant Examiner*—Benny T. Lee
*Attorney, Agent, or Firm*—Wood, Herrn & Evans

[57] ABSTRACT

A compact police radar warning receiver is provided having an antenna in which some of the mixer and oscillator components are secured to the antenna by a cantilever structure formed integral the circuit board overlying a portion of the antenna and to which the components are electrically and mechanically coupled.

5 Claims, 4 Drawing Figures

U.S. PATENT DOCUMENTS

| | | | |
|---|---|---|---|
| 4,121,044 | 10/1978 | Hadersbeck et al. | 361/398 X |
| 4,123,756 | 10/1978 | Nagata et al. | 343/702 |
| 4,126,883 | 11/1978 | Martin | 357/79 X |
| 4,141,028 | 2/1979 | Hulstrunk | 357/79 X |
| 4,195,289 | 3/1980 | Cole | 340/554 |
| 4,200,870 | 4/1980 | Gabbitas | 343/5 PD |
| 4,219,777 | 8/1980 | Richardson | 455/227 |
| 4,224,663 | 9/1980 | Maiese et al. | 357/79 X |
| 4,231,038 | 10/1980 | Holford | 343/5 DD |
| 4,275,369 | 6/1981 | Sekiguchi | 333/209 |
| 4,418,429 | 11/1983 | Roberts | 455/328 X |
| 4,500,945 | 2/1985 | Lipschutz | 361/395 X |
| 4,506,439 | 3/1985 | Roake | 361/395 X |
| 4,546,407 | 10/1985 | Benenati | 361/395 X |
| 4,553,192 | 11/1985 | Babuka et al. | 361/395 |
| 4,571,593 | 2/1986 | Martinson | 343/786 X |

OTHER PUBLICATIONS view, vol. 39, 1980 by P. Harrop, P. Lesarte and T. H. A. M. Vlek.
"Rectangular Wageguide Type Variable Band-Pass Filters", IEEE MTT-S International Microwave Symposium Digest, Orlando, FL, Arp. 30-May 2, 1979, S. Toyoda and M. Ozasa.
Reference Data for Radio Engineers-pp. 23-19.
Foundations for Microwave Engineering, p. 96.
Photographs A-D of the B.E.L.-Tronics Radar Warning Receiver.
Foundations for Microwave Engineering, pp. 322-323.
"Proven Procedures Guide Cavity VCO Design", *Microwave*, (May, 1981).
Microwave Engineer's Handbook, p. 26.

POLICE RADAR WARNING RECEIVER WITH CANTILEVERED PC BOARD STRUCTURE

This Application is a divisional application of the copending application entitled Police Radar Warning Receiver, filed Sept. 28, 1984, Ser. No. 656,026, now U.S. Pat. No. 4,613,989 the disclosure of which is incorporated herein by reference.

This invention relates to receivers, and more particularly to receivers which are uniquely adapted to receive police radar signals and warn the user thereof.

A police radar warning receiver is an electronic assembly mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar.

Typically, a police radar warning receiver includes an antenna, a printed circuit board, the circuitry needed to determine whether the received signal is a police radar signal and to provide appropriate indications and alarms, and a power regulator device which regulates the energy received from a vehicle battery to power the circuitry. These components are located within a box-like housing having four side walls and front and rear end panels. The front panel which, when the receiver is mounted in the vehicle, faces the user, has indicators and control knobs. The rear wall has extending from it a power cord terminating in an appropriately configured plug insertable in the vehicle cigarette lighter socket.

Police radar speed-monitoring units transmit radar signals in either the X-band or the K-band of the frequency spectrum, as discussed in U.S. Pat. No. 4,313,216. Typical radar warning receivers are adapted to detect police radar signals in either band. Accordingly, police radar warning receivers are sometimes referred to as dual frequency radar warning receivers.

One illustrative form of prior art receiver is the ESCORT radar warning receiver currently marketed by the assignee herein, Cincinnati Microwave, Inc. of Cincinnati, Ohio. The ESCORT radar warning receiver contains circuitry permitting it to detect and indicate the presence of both X-band and K-band police radar signals. That circuitry is disclosed in aforesaid U.S. Pat. No. 4,313,216. Briefly, the oscillator generates dual frequency signals which are quasi-harmonically related. These signals mix with the incoming signal and provide an output or mixed signal (the IF). The IF signal is evaluated to determine whether a police radar signal is present in which case an alarm is activated. This process is referred to as heterodyning, or super-heterodyning where the IF is mixed again with another local oscillator signal before evaluation.

Improved versions of the circuitry disclosed in U.S. Pat. No. 4,313,216 are described in U.S. Pat. No. 4,581,769, and U.S. Pat. No. 4,631,542. The latter two patents are also assigned to Cincinnati Microwave, Inc.

Police radar warning receivers are relatively costly and, because their popularity has risen, are prime targets for theft. Unfortunately, typical of these receivers is that they are too large to be conveniently portable such as by carrying them about in one's shirt pocket. Hence, the user would typically leave the receiver with the vehicle when not in use. Further, these receivers are not typically permanently mounted to the vehicle. The result is a significant theft problem.

Accordingly, one object of the present invention has been to provide a police radar warning receiver which is compact enough to be easily portable in one's purse or shirt pocket, for example, and yet does not compromise quality, features or function.

As is true with most products, manufacturers strive to reduce the cost of manufacturing and the complexity of assembly. Accordingly, a further object of the present invention has been to reduce the cost and complexity involved in constructing a police radar warning receiver.

The foregoing objectives have been achieved, in part, by formation of cantilever arms integral with the printed circuit board which hold certain of the oscillator and mixer components in place. The cantilever arms eliminate many of the components which would otherwise be utilized merely to hold these oscillator and mixer components in place.

The printed circuit board with integral cantilever arms also makes possible a reduction in height of the radar warning receiver. Previously, the wall to which the oscillator and mixer components were mounted was relatively thick to cooperate with the fastening components now eliminated by the cantilever arms. Accordingly, the mounting wall thickness has been reduced. As a result, the printed circuit board is mounted closer to the antenna bottom than was previously possible. In the preferred embodiment, the printed circuit board is mounted to the antenna oscillator and mixer sections, and the resultant height is less than the maximum vertical cross-section of the horn. As the horn thus provides the lower limit on the overall height of the receiver, the printed circuit board does not contribute to the height of the receiver.

The objectives and features of the present invention will become more readily apparent from the following detailed description taken with the accompanying drawings wherein like reference numerals apply to like structure and in which.

GENERAL DESCRIPTION OF THE RADAR WARNING RECEIVER

Figure 1:
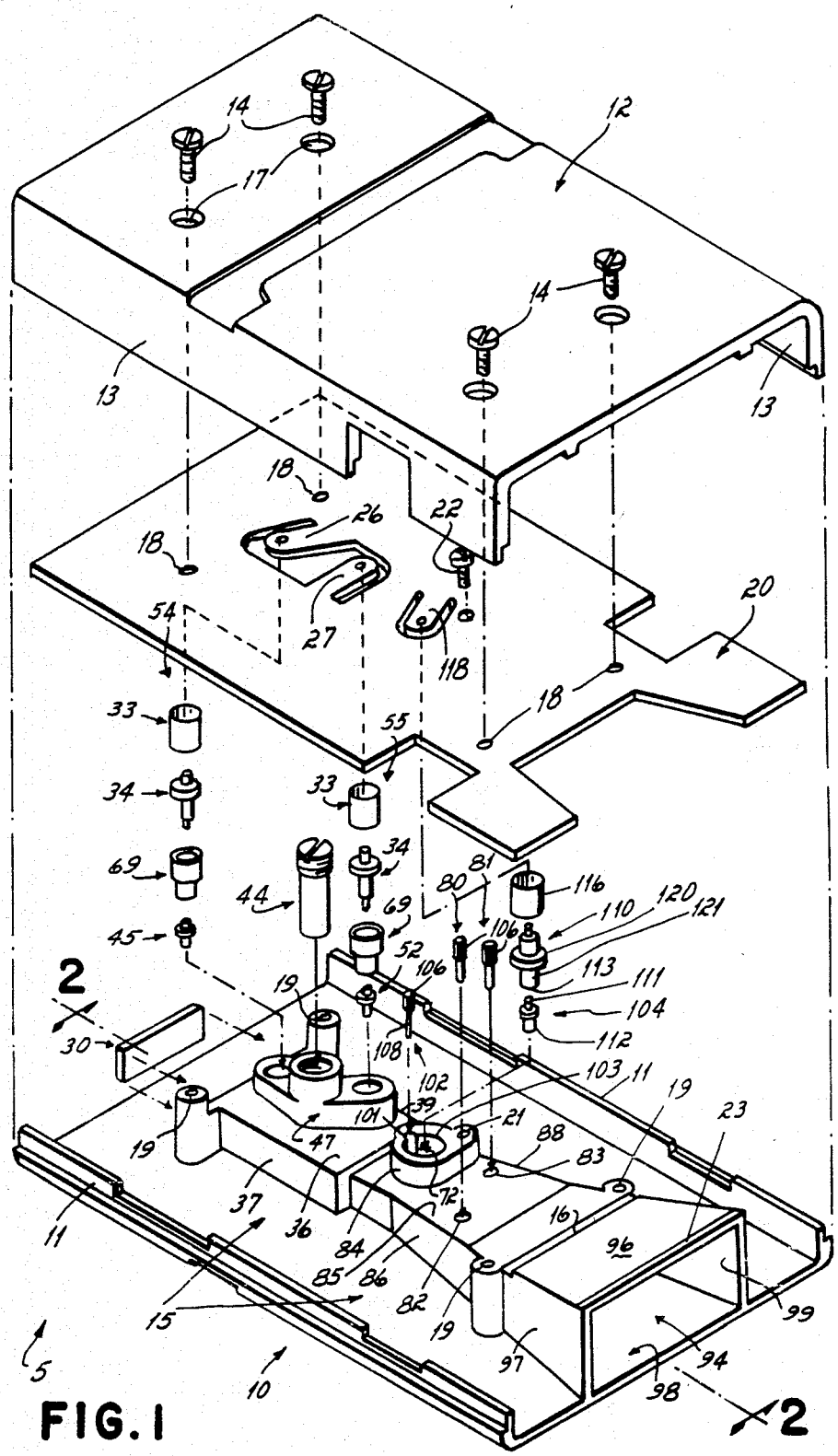
FIG. 1 is an exploded, isometric view of a preferred embodiment of a radar warning receiver of the present invention.

With reference to FIG. 1, there is disclosed the radar warning receiver 5 of the present invention.

Radar warning receiver 5 is comprised of two housing sections 10, 12, a single cast, integral aluminum antenna 15 formed integrally with aluminum bottom housing section 10, and printed circuit board 20 to which is mounted most of the associated circuitry (not shown) to make receiver 5 operable. Such circuitry is disclosed in the aforesaid U.S. Pat. No. 4,313,216, U.S. Pat. No. 4,581,769, and U.S. Pat. No. 4,631,542. The disclosures of the foregoing patents are all incorporated herein by reference.

Radar warning receiver 5 further includes a plurality of oscillator and mixer components which are mounted directly to antenna 15 as will be discussed. The front and rear panels, switches, indicators and jacks have been deleted to facilitate discussion. A completely assembled radar warning receiver as shown in FIG. 1 is disclosed in U.S. Pat. No. Des. 288,418, which is assigned to Cincinnati Microwave, Inc. That disclosure is incorporated herein by reference.

Receiver 5 is assembled by placing the necessary components into the antenna 15 (as will be discussed), mounting board 20 over antenna 15 until it rests over the components and on shelf 16 of antenna 15. Board 20 is held to antenna 15 by screw 22 as at hole 21. Housing sections 10 and 20 are mated together such that their mating lips 11, and 13, abut each other. Top 12 is secured to bottom 10 by screws 14 which are received through housing section 12 at hole 17, through board 20 as at hole 18, and received in housing section 10 as at hole 19. When assembled, part of the interior of housing top 12 rests on ledge 23 formed at the forwardmost end of antenna 15. Ledge 23 is spaced from bottom 10 further than any other portion of antenna 15, thereby placing a lower limit on the height of receiver 5 when assembled.

Because antenna 15 is formed integral with bottom housing section 10, there is no assembly needed to mount antenna 15 to housing 10.

DETAILED DESCRIPTION OF THE RADAR WARNING RECEIVER

Figure 2:
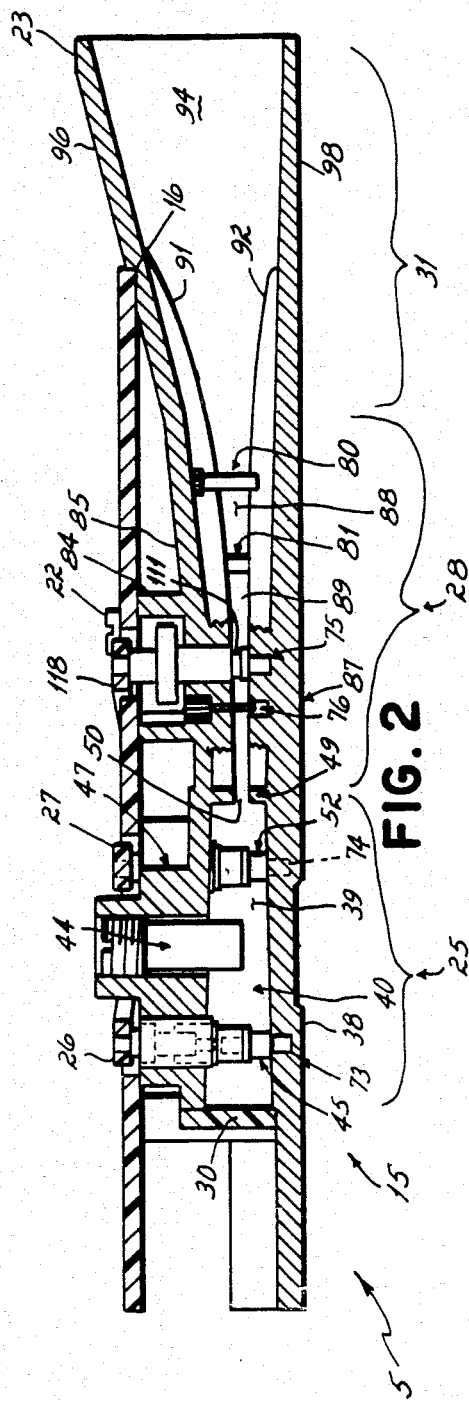
FIG. 2 is a non-exploded, cross-sectional view of the radar warning receiver of FIG. 1, taken along line 2—2, but without the housing top.

Single cast, integral antenna 15 includes a rearward oscillator section 25, a forward horn section 31, and a mixer section 28 disposed therebetween (see FIG. 2).

Figure 3:
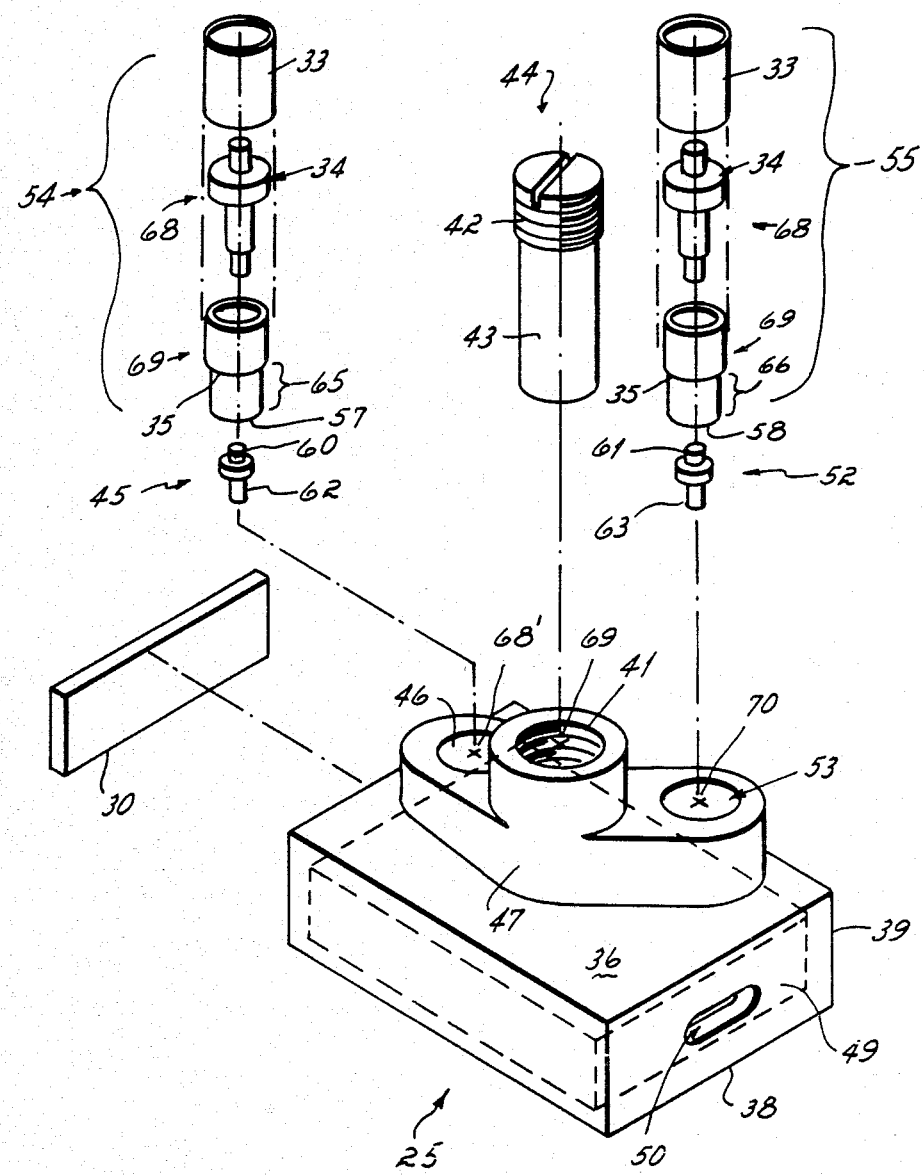
FIG. 3 is an exploded, isometric view of the oscillator section of the radar warning receiver of FIG. 1.

Oscillator section 25 has mounted to it a variety of oscillator components which are mounted to, or through, its top wall 36 (FIG. 3). It is to be understood herein that when the term "mounted to" is used, it is meant to connote that the item is either physically in contact therewith or that by cooperation with other parts which do make physical contact therewith, the item is inserted therethough and held in place by those other parts. Thus, Gunn diode 45 which is within oscillator cavity 40 is mounted to top wall 36 inasmuch as diode 45 is insertable through hole 46 and is held in place by a variety of parts, as will be discussed, which do contact mounting wall 47 which is integral to and thus part of the exterior of top wall 36.

Mixer section 28 also has mounted to it a variety of components. Further, mixer section 28 and horn section 31 are provided with impedance transformation ridges 91, 92 as discussed in the aforesaid parent application hereto.

Each section 25, 28, 31 of antenna 15 has at least four walls referred to herein as top, bottom, left and right walls. Those walls cooperate to define a respective section cavity as will be discussed herein. Oscillator section 25 has top wall 36, a left wall 37, a bottom wall 38 and a right wall 39 which cooperate to define the oscillator cavity 40 referred to above. Mixer section 28 similarly has a top wall 85, a left wall 86, bottom wall 87 and right wall 88 which cooperate to define a mixer cavity 89. Finally, horn section 31 has a top wall 96, a left wall 97, a bottom wall 98, and a right wall 99 cooperating to define a horn cavity 94.

As mentioned earlier, all of the oscillator components are mounted to top wall 36 of oscillator section 25 through mounting wall 47 while all of the mixer components are mounted to top wall 85 of mixer section 28 through mounting wall 84.

As seen in FIG. 2, the interior cavity-facing surfaces of bottom walls 38, 87 and 98 are substantially flat, with the exception of the mounting depressions or the ridges to be discussed below, and thus cooperate to define a plane. In actual practice, the inner bottom wall plane is not truly parallel to the exterior plane because of manufacturing processes involved in casting, resulting in a draft affect.

The walls of antenna 15 must diverge from each other to permit the casting cores to be easily pulled from the oscillator section and the mixer and horn sections resulting in thicker bottom walls near wall 49 than spaced away from wall 39. For example, bottom wall 87 of mixer section 28 is 0.098 inches thick adjacent to slotted wall 49; at the interface 90 of mixer section 28 and horn section 31, the thickness of the bottom wall is 0.069 inches; and at the aperture 95 of horn 31, bottom wall 98 is 0.040 inches thick. Similarly, bottom wall 38 is 0.098 inches thick at wall 49 and 0.085 inches thick at the rearward end of section 25 at wall 30.

The bottom walls 38, 87, 98 are advantageously as thin as possible while still providing structural support for receiver 5. The spacing between the top and lower walls generally affects operation of antenna 15. Thus, the thinner the bottom walls, the closer the top walls can be to the exterior of the bottom walls to provide a slim, compact receiver 5.

Another result of the draft provided during casting is that walls whose inner surfaces are preferably parallel will diverge slightly. Accordingly, as used herein, the term substantially parallel indicates that parallelism is satisfied where, but for the minor divergence induced by draft, the surfaces or planes would be parallel. For example, the inner surfaces of walls 36 and 38 are preferably parallel and spaced apart 0.195 inches. However, due to draft, they are spaced apart 0.185 inches adjacent wall 49 and 0.210 inches adjacent wall 30.

DETAILED DESCRIPTION OF OSCILLATOR 25

Oscillator section 25 has a box-shaped cavity 40 defined by the substantially smooth, flat inner cavity-facing surfaces of walls 36, 37, 38 and 39. The inner surfaces of spaced apart walls 36 and 38 are substantially parallel whereas the inner surfaces of spaced apart walls 37 and 39 are similarly substantially parallel to one another but substantially perpendicular to the inner surfaces of walls 36 and 38. Oscillator section 25 also includes forward slotted wall 49 which forms the rearward wall of mixer 28. Forward wall 49 substantially closes off cavity 40 thereby keeping sufficient energy within cavity 40 to sustain oscillations. Wall 49 is also provided with a centered and oval-shaped iris 50 to permit some of the oscillator energy to escape into mixer cavity 89.

Top wall 36 is provided with an integral mounting wall 47 through which are mounted the oscillator components: Gallium Arsenide (GaAs) Gunn diode 45; Gallium Arsenide varactor diode 52, folded chokes 54, 55 and tuning rod 44.

Each of the chokes 54, 55 have diode mounts 57, 58 at their lower extremities in which are inserted anode 60 and cathode 61 of diodes 45 and 52, respectively. Cathode 62 and anode 63 of diodes 45 and 52, respectively, are received in mounting depressions 73, 74, repectively, formed in bottom wall 38. The barrels 65, 66 of chokes 54, 55, respectively, are mounted within cavity 40 and are 0.125 inches in diameter.

To mount these components to wall 36, diode 45 and choke 54 are inserted through mounting hole 46 and diode 52 and choke 55 are inserted through mounting hole 53. Preferably, the vertical dimension of the components (choke 54 and diode 45 or choke 55 and diode 52) relative to bottom wall 38 when mounted to wall 36 is such that the cantilevered arms 26, 27 will be deflected slightly upwardly once printed circuit board 20 is secured over antenna 15 as shown in FIG. 2. Hence, once assembled, force is exerted between the mating portions of the components, bottom wall 38 and the cantilever arms. That is, downward pressure from cantilevered arms 26 and 27 holds chokes 54, 55 against diodes 45, 52, thereby keeping the diodes mounted securely to top wall 36.

Diodes 45 and 52 are "post coupled". Folded chokes 54, 55 provide a DC short circuit and an AC inductive coupling between the anode 60 and the cathode 61 of their respective mating diodes 45, 52 and the associated operating circuitry (not shown) of receiver 5. Chokes 54, 55 also capacitively couple the anode 60 and cathode 61 to the walls of oscillator 25. To insulate them from DC electrical contact with the oscillator walls and to hold their respective silver-plated hard brass components (68, 69) together, chokes 54, 55 are provided with heat-shrinkable sleeves 33. As shown in FIG. 2, sleeves 33 are heat shrunk around chokes 54, 55 to conform to their shape. The sleeves extend from above the shoulder 34 of top pieces 68 to just below the ledge 35 of bottom pieces 69, respectively.

Tuning rod 44, which has a threaded brass top 42 and a cylindrical alumina body 43 is received through threaded mounting hole 41 and can be adjusted to project into cavity 40 the desired distance to tune oscillator 25. The location of diode 45 is determined with reference to its central or vertical axis 68'. The location of varactor diode 52 and tuner 44 are determined with respect to their central axes 70 and 69, respectively.

Figure 4:
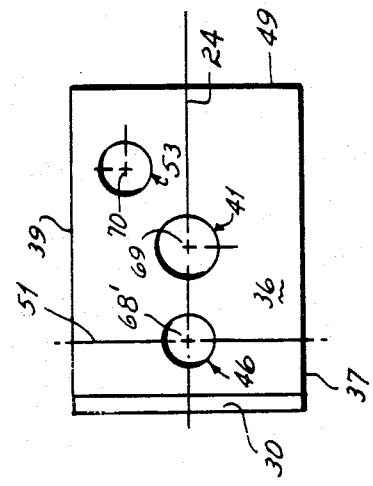
FIG. 4 is a top plan view of the oscillator section of FIG. 3.

Electrically, cavity 40 includes the volume between slotted wall 49 and a parallel plane 51 which intersects central axis 68' (FIG. 4), between the inner surfaces of walls 37 and 39, and between the inner surfaces of walls 36 and 38. Central axis 68' is equidistant from the inner surface of both walls 37 and 39 and thus lies along the longitudinal axis 24 of section 25 (as well as antenna 15).

Cemented to the rear end of oscillator 25 is preferably a ferrite wall 30. Wall 30 is spaced rearwardly from diode 45 but could be eliminated although it improves oscillator 25 by suppressing certain undesirable signals.

Oscillator 25 is disclosed in U.S. Pat. No. 4,583,057, which is assigned to Cincinnati Microwave, Inc. The disclosure of said U.S. Pat. No. 4,583,057 is incorporated herein by reference.

DETAILED DESCRIPTION OF THE MIXER COMPONENTS

Mixer section 28 is provided with mounting wall 84 and slots 82, 83 to receive the mixer components which are mounted to mixer top wall 85. Mounted to integral mounting wall 84 is metal tuning rod 102, mixer diode 104 (having a central axis 72) and choke 110. Inserted through slots 82, 83 are metal pins 80, 81, respectively. Tuner 102, diode 104 and choke 110 are positioned in front of iris 50 and between the inner surfaces of walls 86, 88. Tuner 102 is received in bore 101 which overlaps into mounting hole 103 through which diode 104 and choke 110 are inserted. Tuner 102 has a splined top 106 and a needle nose 108 which can project into mounting depression 76 (see FIG. 2). Tuner 102 is inserted to an appropriate depth into cavity 89 to tune the mixer and the splines 106 will frictionally engage the walls of bore 101. Alternatively, tuner 102 could have a threaded top 106 (not depicted) and bore 101 could be similarly threaded to permit tuning of tuner 102. The former is preferred as tuning is maintained once tuner 102 is positioned. The latter would require an additional locking washer to keep tuner 102 from changing its factory installed setting.

Cathode 112 of diode 104 is received in mounting depression 75 formed in ridge 92. Diode 104 is also "post coupled". Anode 111 of diode 104 is received in mating diode mount 113 in the underside of silver-plated hard brass choke 110. Barrel 121 of choke 110 is 0.085 inches in diameter and partially within mixer cavity 89. Choke 110, although only a single piece, thus functions much like chokes 54 and 55 and is similarly insulated with heat shrinkable sleeve 116 extending from above shoulder 120 to the bottom of barrel 121. Once inserted, and board 20 attached, diode 104 is held in place by the downward force applied to choke 110 by cantilever arm 118.

Pins 80, 81 are inserted through slots 82, 83, respectively, and are frictionally held therein by engagement of the splined tops 106 with the edges of slots 82, 83.

For further detail regarding the preferred mixer and or horn sections, reference is had to the aforementioned parent application hereto, which has been incorporated herein by reference.

With respect to FIG. 2, antenna 15 is shown in combination with printed circuit board 20 showing how the chokes and diodes are mounted to top walls 36 and 85, respectively, of the oscillator and mixer sections and yet are retained in place by the action of cantilevered arms 26, 27, and 118 rather than by additional grommets and lock washers, for example, which might otherwise be used to hold those components in place. Cantilever arms 26, 27, and 118 are integrally formed in board 20. The use of such cantilevers and elimination of the additional grommets and washers results in reduced size and reduced cost of manfacture and less complexity of assembly. The ESCORT radar warning receiver (not shown) currently being commercialized utilizes such grommets and lock washers.

The receiver 5 is provided with a suitable power regulator (not shown) to regulate the battery energy from a vehicle (not shown) to provide the appropriate voltage level to the circuitry of receiver 5. In a preferred embodiment, the power regulator is off-board and contained within the power plug as described in U.S. Pat. No. 4,604,529, assigned to Cincinnati Microwave, Inc., the disclosure of which is incorporated herein by reference.

Having described the invention, what is claimed is:
1. In combination:
(a) a microwave circuit including:
   a first wall having an inner surface;
   a second wall spaced from said first wall and confronting said inner surface thereof to define a microwave cavity therebetween, said second wall having an outer surface;
   circuit component means having opposite ends, one end of which projects toward said inner surface of said first wall, another end of which projects outwardly of said cavity through a hole in said second wall; and (b) a circuit board secured with respect to said microwave circuit in overlying relationship to said outer surface of said second wall exteriorly of said cavity, said circuit board including:

a cantilever arm portion and a remainder portion, said cantilever arm portion having an inner end and a distal end, said cantiliever arm portion integrally connected to said remainder portion only at said inner end, whereby said distal end will deflect and said remainder portion will not substantially deflect when a deflecting force is applied to said distal end, said circuit board being positioned relative to said microwave circuit when secured with respect thereto, such that said distal end is positioned atop the circuit component means and in contact with said another end thereof so that said component means provides said deflecting force to thereby deflect said distal end, whereby said distal end cooperates with at least said first wall to maintain said circuit component means one end in contact with said inner surface of said first wall.

2. The combination of claim 1 wherein said first wall inner surface is electrically conductive so that said circuit component means is maintained in electrical contact with said first wall inner surface when said circuit board is secured with respect to said microwave circuit.

3. The combination of claim 1 wherein said circuit component means includes a first circuit element and a second circuit element, said first and second circuit elements each have opposite ends and are electrically series connected so that when said circuit board is secured relative to said microwave circuit, said deflected cantilever arm portion distal end further maintains one of said opposite ends of said first circuit element in contact with one of said opposite ends of said second circuit element.

4. The combination of claim 3 wherein said first wall inner surface is electrically conductive so that said circuit component means is maintained in electrical contact with said first wall inner surface when said circuit board is secured with respect to said microwave circuit.

5. The combination of claim 4 wherein said one of said opposite ends of said first circuit element is also maintained in electrical contact with said one of said opposite ends of said second circuit element when said circuit board is secured with respect to said microwave circuit.

* * * * *

UNITED STATES PATENT AND TRADEMARK OFFICE
CERTIFICATE OF CORRECTION

PATENT NO. : 4,686,499
DATED : August 11, 1987
INVENTOR(S) : Gregory Rhodes Furnish It is certified that error appears in the above-identified patent and that said Letters Patent is hereby corrected as shown below:

Col. 3, line 16, after "12" add -- as --.

Col. 4, line 13, change "39" to -- 49 --.

Col. 4, line 59, delete "gallium arsenide" and insert -- GaAs --.

Col. 4, line 65, change "73," to -- 73 and --.

Signed and Sealed this

Second Day of February, 1988

*Attest:*

DONALD J. QUIGG

*Attesting Officer*    *Commissioner of Patents and Trademarks*